United States Patent [19]
Fukushima et al.

[11] Patent Number: 5,109,296
[45] Date of Patent: Apr. 28, 1992

[54] TRANSMISSION LINE SWITCHING SYSTEM

[75] Inventors: Takeo Fukushima, Kazo; Kohichi Nishimura; Masumi Kurokawa, both of Yokohama, all of Japan

[73] Assignee: Fujitsu Limited, Kawasaki, Japan

[21] Appl. No.: 693,179

[22] Filed: May 6, 1991

Related U.S. Application Data

[63] Continuation of Ser. No. 320,579, Mar. 8, 1989, abandoned.

Foreign Application Priority Data

Mar. 9, 1988 [JP] Japan .................. 63-55325

[51] Int. Cl.⁵ .................. H04B 10/02; H04B 10/08
[52] U.S. Cl. .................. 359/174; 359/110; 379/4; 370/16
[58] Field of Search .................. 455/601; 340/825.01, 340/827; 370/16, 13.1; 379/4, 26, 32-33; 375/3; 371/8.2, 11.1, 11.2; 359/110, 174, 177

[56] References Cited

U.S. PATENT DOCUMENTS

| | | | |
|---|---|---|---|
| 3,864,533 | 2/1975 | Erlund | 379/26 |
| 3,876,983 | 4/1975 | Zafiropulo et al. | 371/11.2 |
| 3,882,456 | 5/1975 | Takada | 371/8.2 |
| 4,347,607 | 8/1982 | Nixon et al. | 379/33 |
| 4,449,247 | 5/1984 | Waschka, Jr. | 455/601 |
| 4,630,268 | 12/1986 | Rodenbaugh | 379/4 |
| 4,688,260 | 8/1987 | Shutterly et al. | 455/601 |

FOREIGN PATENT DOCUMENTS

| | | | |
|---|---|---|---|
| 144953A3 | 12/1984 | European Pat. Off. | |
| 0149851 | 11/1981 | Japan | 371/11.2 |
| 62-219720 | 9/1987 | Japan | |

OTHER PUBLICATIONS

Naohiro Kakizaki et al.; Review of the Electrical Communication Laboratory; A Study of an Automatic Supergroup Switching System; Oct. 1969; vol. 17, No. 10, pp. 1110-1122.

*Primary Examiner*—Reinhard J. Eisenzopf
*Assistant Examiner*—Kinfe-Michael Negash
*Attorney, Agent, or Firm*—Staas & Halsey

[57] ABSTRACT

A transmission line switching system for switching a transmission line in operation to another transmission line when a fault occurs in the transmission line during operation comprising: a transmission line in operation constituted by a plurality of terminal repeaters, a plurality of circuit switching apparatuses, and a plurality of transmission cables, all connected in series; and another transmission line provided between a head terminal repeater and an end terminal repeater; wherein when a transmission cable is completely disconnected, information input from the head terminal repeater is returned from a terminal repeater located just before a disconnection in the transmission cable to the head terminal repeater, transferred from the head terminal repeater to the end terminal repeater through the another transmission line, returned from the end terminal repeater to a terminal repeater located just after the disconnection in the transmission cable, and returned to the end terminal repeater.

8 Claims, 8 Drawing Sheets

TRANSMISSION LINE SWITCHING SYSTEM

This application is a continuation of application Ser. No. 07/320,579, filed Mar. 8, 1989, incorporated by reference herein and now abandoned.

BACKGROUND OF THE INVENTION

1. Field of the Invention

The present invention relates to a transmission line switching system, particularly, it relates to a transmission line switching system for taking countermeasures against faults occurring in a transmission cable between remote locations (for example, between cities) through a plurality of terminal repeaters.

2. Description of the Related Art

Transmission lines used for data transmission, telephone circuits, and the like are constituted by, for example, an optical fiber cable or a coaxial cable as the transmission cable. Recently, optical fiber cables are widely utilized as a transmission cable due to the high speed and large volume data transmission obtained thereby.

In general, such a transmission cable is constituted by main cables and a spare cable (or cables). The spare cable is used in an emergency and is usually bundled together with the main cables as one transmission cable.

The most frequent type of transmission cable fault is disconnection of the cable, particularly, a complete disconnection of an optical fiber cable. Such a complete disconnection occurs, for example, during construction or when the cable is damaged by flood water, since an optical fiber cable is very thin and is not bendable.

When complete disconnection of the cable occurs, the transmission line must be switched to another transmission line, since the spare cable is also disconnected.

A problem occurs, however, in switching the transmission line, particularly, a transmission line connected by a plurality of terminal repeaters each having an intermediate relay function, as explained hereinafter.

Regarding transmission line switching systems, Japanese Unexamined Patent Publication (Kokai) No. 54-127615 discloses a switching system of a communication line for effectively utilizing a plurality of spare lines by selecting change-over switches; Japanese Unexamined Patent Publication (KOKAI) No. 59-175224 discloses a transmission line switching system for effectively switching between main lines, and between a main line and a spare line in accordance with the priority of the information; and Japanese Unexamined Patent Publication (KOKAI) No. 62-219720 discloses a transmission line switching system for effectively switching a plurality of spare lines.

Nevertheless, the above documents do not disclose a loop back function according to the present invention.

SUMMARY OF THE INVENTION

The object of the present invention is to provide a transmission line switching system enabling a quick switching of a transmission line to another line when a fault, particularly a complete disconnection of the cable, occurs in the transmission line during operation.

In accordance with the present invention, there is provided a transmission line switching system for switching a transmission line in operation to another transmission line when a fault occurs in the transmission line during operation, comprising: an operating transmission line constituted by a plurality of terminal repeaters, a plurality of circuit switching apparatuses, and a plurality of transmission cables, all connected in series; and another transmission line provided between a head terminal repeater and an end terminal repeater; wherein if a transmission cable is completely disconnected, information input from the head terminal repeater is returned from a terminal repeater located just before a disconnection in the transmission cable to the head terminal repeater, transferred from the head terminal repeater to the end terminal repeater through the another transmission line, returned from the end terminal repeater to a terminal repeater located just after the disconnection in the transmission cable, and returned to the end terminal repeater.

DESCRIPTION OF THE PREFERRED EMBODIMENTS

Before describing the preferred embodiments, an explanation will be given of a conventional transmission line switching system and the problems thereof.

Figure 1:
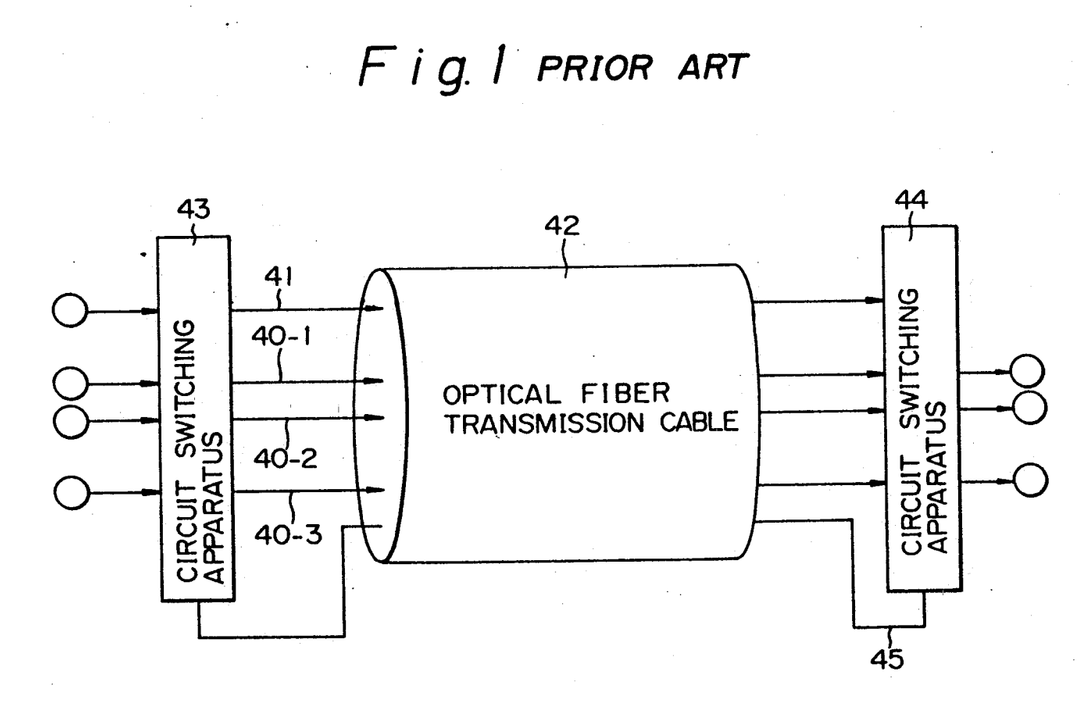
FIG. 1 is a schematic diagram of a conventional transmission line switching system.

FIG. 1 is a schematic diagram of a conventional transmission line switching system applied to an optical fiber transmission line. In FIG. 1, 40-1 to 40-3 are main cables made of optical fibers and used normally, and 41 is a spare cable also made of an optical cable and used in the case of a fault in the main cable; 42 is an optical fiber transmission cable bundled with the main cables 40-1 to 40-3 and the spare cable 41; 43 and 44 are circuit switching apparatuses each connected to the main cables 40-1 to 40-3 and the spare cable 41, 45 is a control signal for simultaneously switching the circuit switching apparatus 43, 44 from any main cable 40-1 to 40-3 to the spare cable 41 when a fault occurs in a main cable 40-1 to 40-3.

This type of spare cable, however, cannot be used when the transmission cable 42 is completely disconnected. As explained above, the complete disconnection occurs, for example, during construction or when the cable is damaged by flood water, and much time is required to recover the transmission line.

Figure 2:
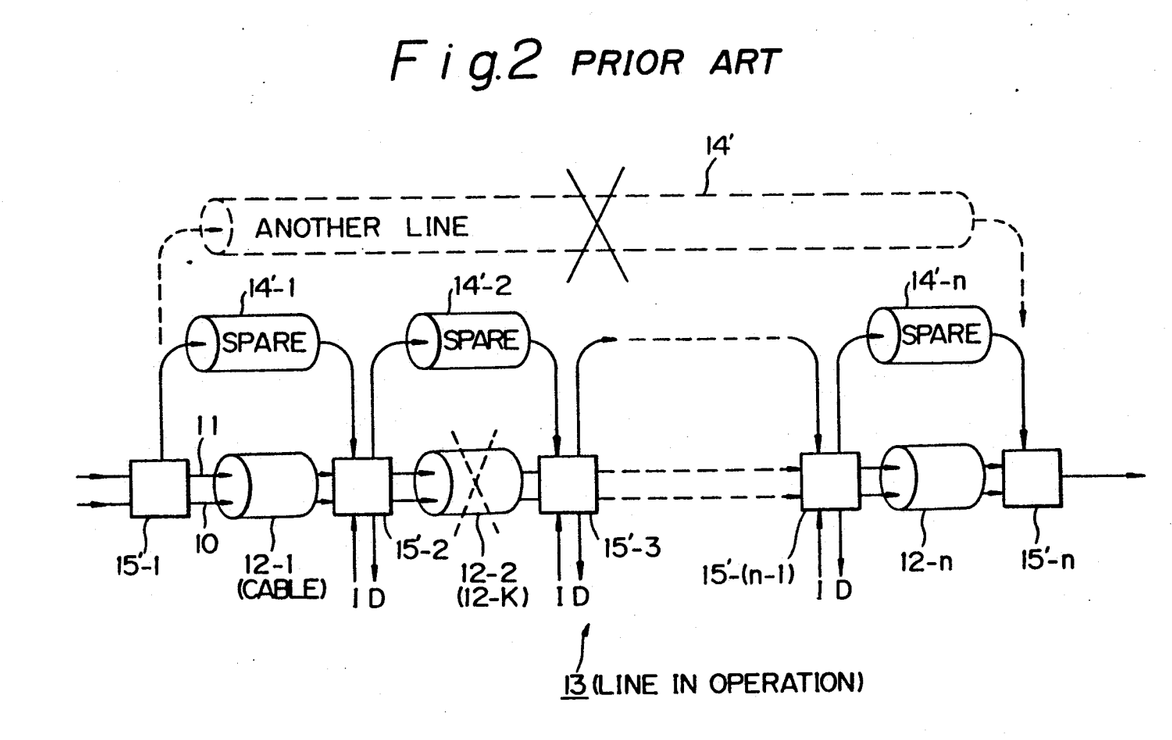
FIG. 2 is a schematic diagram of another conventional type transmission line switching system.

FIG. 2 is a schematic diagram of another conventional type transmission line switching system applied to an optical fiber transmission line. In FIG. 2, 10 is the main cable and 11 is the spare cable; 12-1 to 12-n are optical fiber transmission lines, 14'-1 to 14'-n are spare transmission lines, and 15'-1 to 15'-n are terminal repeaters. Each of the spare transmission lines 14'-1 to 14'-n is provided between terminal repeaters 15'-1 to 15'-n for countermeasures against a fault in the main cable. Each of the terminal repeaters 15'-1 to 15'-n has an intermediate relay function (below, intermediate repeater) and can branch the information to an external circuit (not shown). That is, the information can be input (inserted) to or output (derived) from the external circuit as shown by "I" (insertion) and "D" (derivation).

For example, when the optical fiber cable 12-2 is completely disconnected, the transmission line is switched to the spare transmission line 14'-2. As is obvious from the above, in a transmission line connected through a plurality of intermediate repeaters, a spare transmission line must be provided between each of the intermediate repeaters because each repeater has a relay function for branching the information to an external circuit. In this case, it is impossible to provide another transmission line 14' between the terminal 15'-1 and the terminal 15'-n because each repeater has an intermediate relay function.

To provide a spare transmission line between each of the intermediate repeaters is very expensive, and accordingly, it is difficult to realize such a transmission line switching system at the present time.

Figure 3:
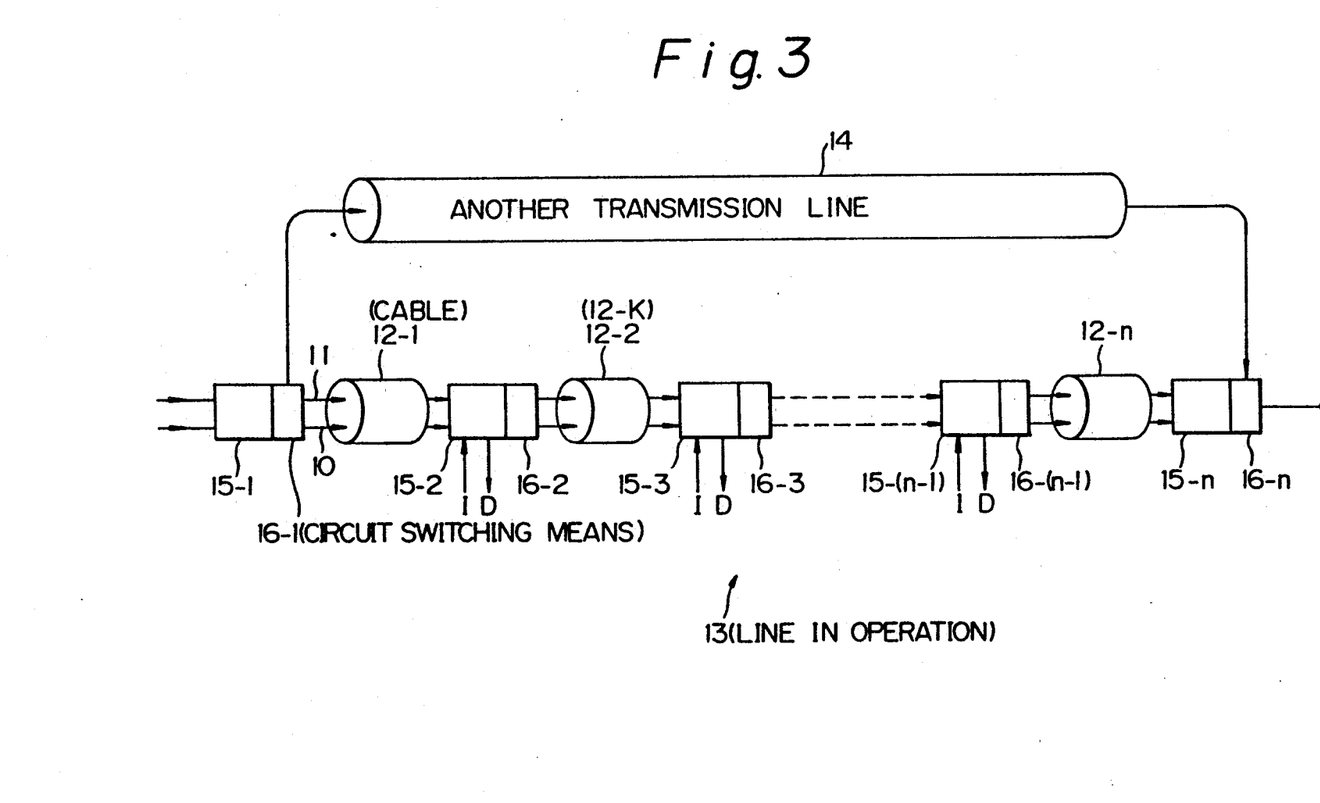
FIG. 3 is a schematic diagram of a transmission line switching system according to the present invention.

FIG. 3 is a schematic diagram of a transmission line switching system according to the present invention. In FIG. 3, the current cable 10 is made of an optical fiber and used under normal conditions; 11 is the spare cable made of an optical fiber and used in the case of a fault in the main cable; 12-1 to 12-n are optical fiber transmission lines bundled with the current cable 10 and the spare cable 11; 13 is the transmission line in operation; 14 is another transmission line switched from the transmission line 13; 15-1 to 15-n are terminal repeaters; and 16-1 to 16-n are circuit switching apparatuses provided adjacent to each intermediate repeater. The terminal repeaters 15-1 to 15-n, the circuit switching apparatuses 16-1 to 16-n, and the transmission cables 12-1 to 12-n are connected in series in the transmission line 13.

Figure 8:
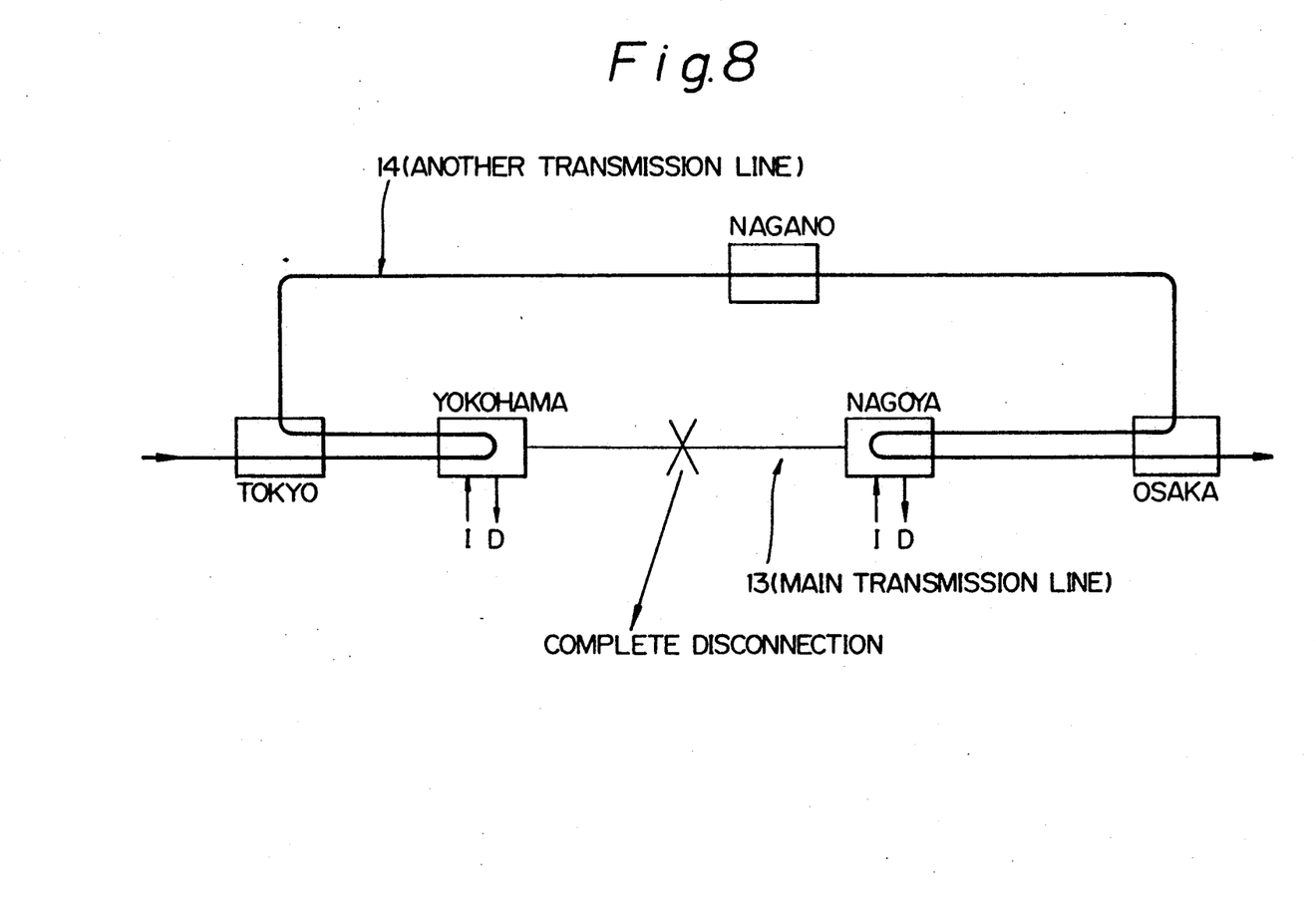
FIG. 8 is a schematic diagram of one example of the transmission line connected between cities located a great distance apart through a plurality terminal repeaters.

Another transmission line 14 is provided between the head terminal repeater 15-1 and the end terminal repeater 15-n for countermeasures against a fault in the main cable. In this case, a transmission line 14 is already constructed and can be utilized as the other transmission line, as shown in FIG. 8, and accordingly, it is not necessary to provide a new transmission line as the spare transmission line.

Each of the terminal repeaters 15-1 to 15-n has an intermediate relay function (intermediate repeater) which can branch information to an external circuit. That is, the information can be inserted or derived from the external circuit as shown by "I" (insertion) and "D" (derivation). The above functions are the same as the conventional system.

Further, the circuit switching apparatuses 16-1 to 16-n are provided adjacent to each of the terminal repeaters 15-1 to 15-n. Each circuit switching apparatus 16-1 to 16-n has a switching function for switching the connection of the cable, and has a loop back function for returning the signal as explained hereinafter.

Figure 4:
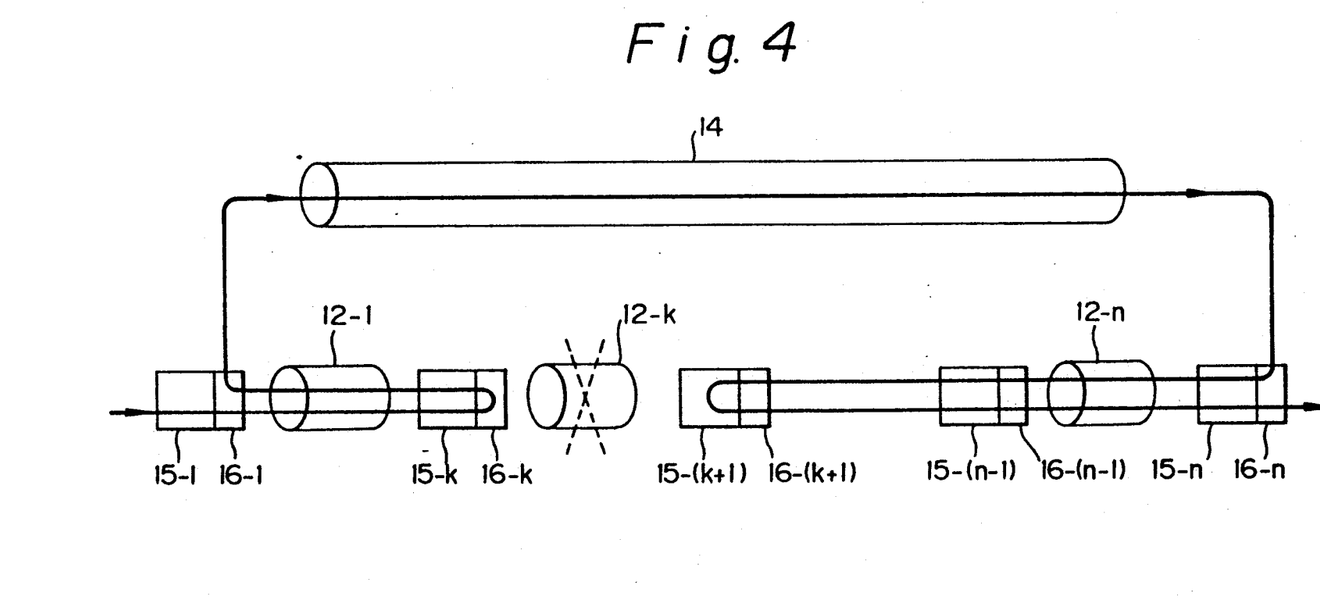
FIG. 4 is a schematic diagram for explaining a flow of the information in the transmission line having the transmission line switching system shown in FIG. 3 when a fault occurs in the transmission cable.

FIG. 4 is a schematic diagram for explaining the flow of the information in a transmission line having the transmission line switching system shown in FIG. 3 when a fault occurs in the transmission cable. As explained above, each circuit switching apparatus 16-1 to 16-n has a switching function and a loop back function, and accordingly, when the transmission cable 12-k is completely disconnected, the connection of the optical fiber cable is switched in the circuit switching apparatus 16-k and 16-(k+1). The information transmitted from the terminal repeater 15-1 is returned from the switching apparatus 16-k to the circuit switching apparatus 16-1 and sent to the terminal repeater 15-n through another transmission line 14 and the circuit switching apparatus 16-n. The information transmitted to the repeater 15-n is forwarded to the intermediate repeater 15-(k+1) and returned to the terminal repeater 15-n by the circuit switching apparatus 16-(k+1).

In this case, the information to be returned is selected based on the priority applied to each block of information. That is, the information having a higher priority is connected to the cable having the lower priority in accordance with the priority order.

As is obvious from the above explanation, each of the intermediate repeaters can carry out an intermediate relay function to branch the information to an external circuit even if an optical fiber transmission cable is completely disconnected, i.e., the information can be inserted into or derived from the external circuit.

Figure 5:
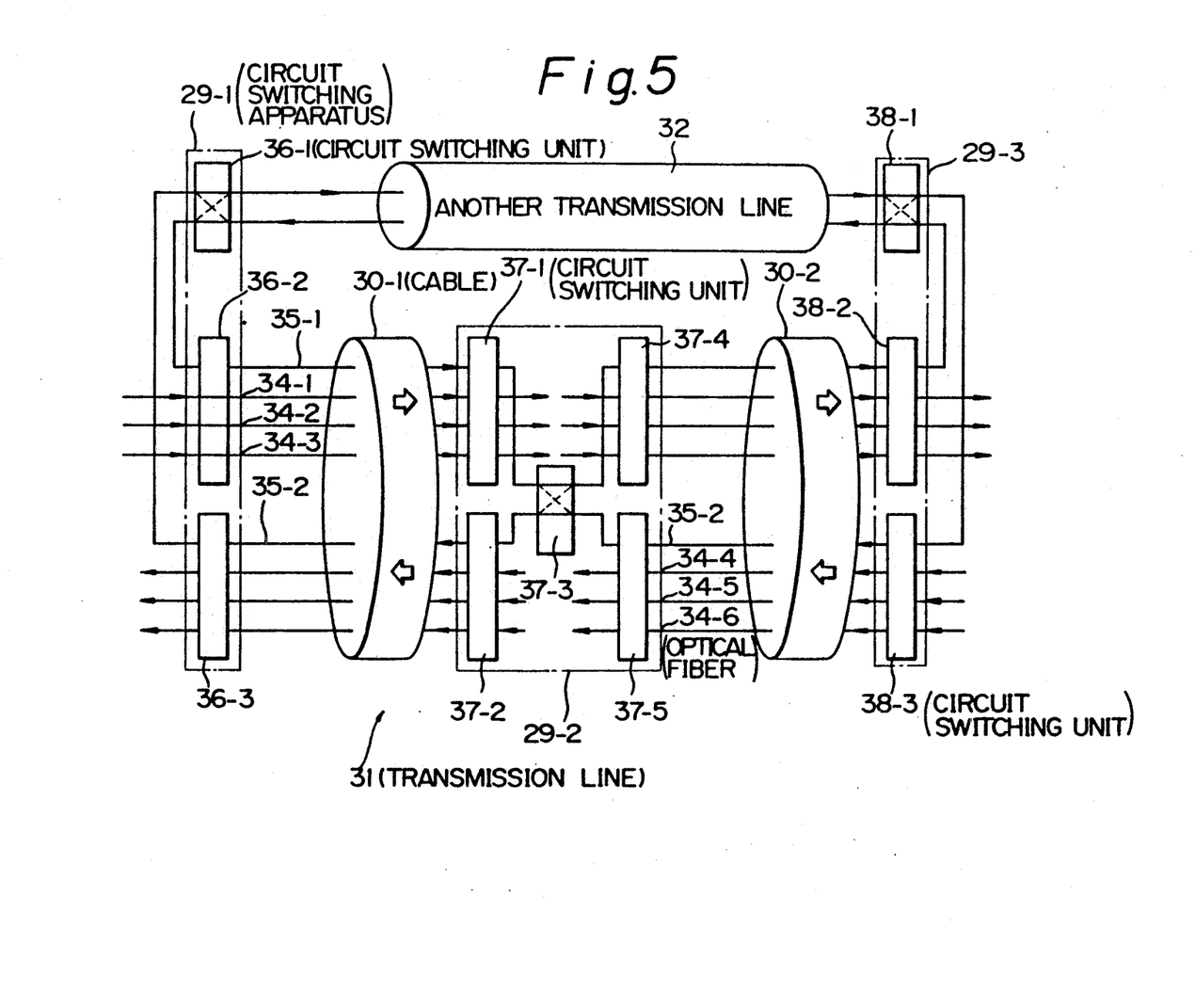
FIG. 5 is a detailed diagram of the transmission line switching system shown in FIG. 3.

FIG. 5 is a detailed diagram of the transmission line switching system shown in FIG. 3. In FIG. 5, 29-1 to 29-3 are circuit switching apparatuses for switching the connecting of the cable, and correspond to the circuit switching apparatuses 16-1 to 16-n shown in FIGS. 3 and 4; 30-1 and 30-2 are optical fiber cables corresponding to the cables 12-1 to 12-n in FIGS. 3 and 4, and are connected in series; 31 is the transmission line in operation; 32 is another transmission line corresponding to the line 14 in FIGS. 3 and 4; 36-1 to 36-3, 37-1 to 37-5 and 38-1 to 38-3 are circuit switching units provided in each circuit switching apparatus; 34-1 to 34-6 are the main cables used under normal conditions; and 35-1 and 35-2 are the spare cables used in the case of a fault in the main cable. For example, a conventional optical switch enabling a parallel or cross connection can be utilized for each circuit switching unit 36-1 to 36-3, 37-1 to 37-5 and 38-1 to 38-3. The intermediate repeaters 15-1 to 15-n are not shown in this drawing, to facilitate the explanation.

Figure 6:
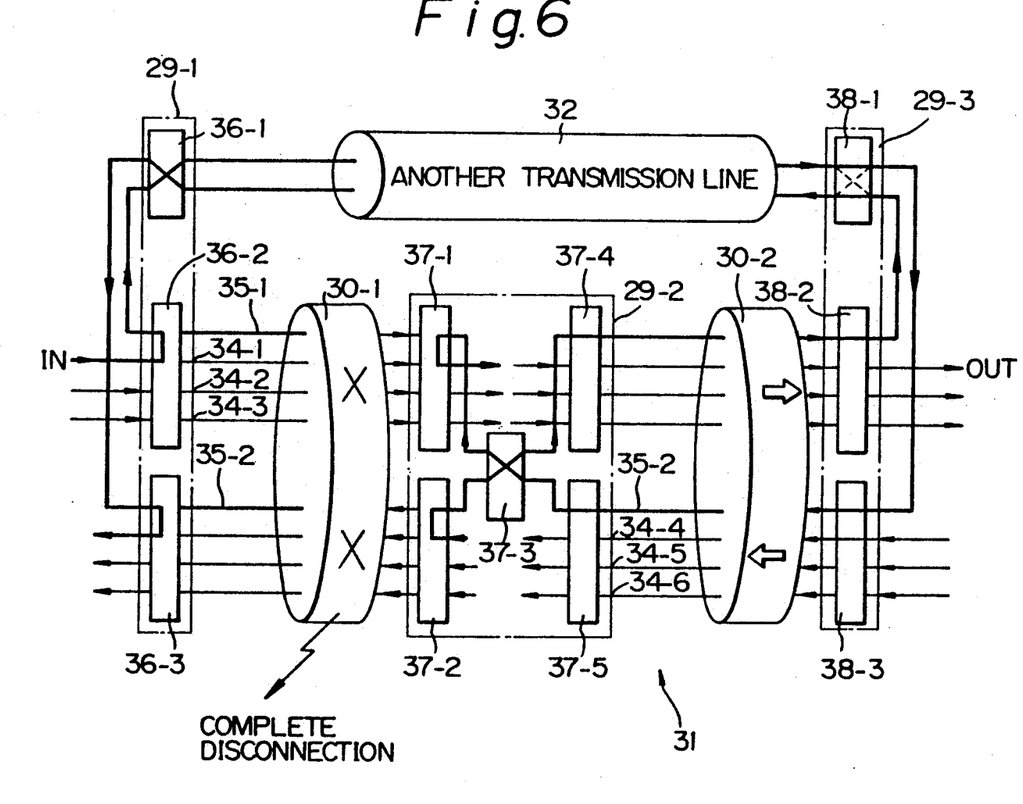
FIG. 6 is a detailed diagram for explaining one connection configuration and flow of the information in a transmission line switching system shown in FIG. 5.

FIG. 6 is a detailed diagram for explaining one connection configuration and flow of the information in the transmission line switching system shown in FIG. 5. In FIG. 6, the thick solid line denotes the flow of the information when the optical fiber cable 30-1 is completely disconnected. Note, in this case, the spare cable 35-1 also can not be used.

The information input from "IN" is switched by the switching unit 36-2 and flows to the other transmission line 32 through the switching unit 36-1, the information is next transferred to the spare cable 35-2 of the optical fiber cable 30-2 through the switching units 38-1 and 38-3, and the information is then transferred to the switching unit 37-1 through the switching units 37-3 and 37-5, and the information "OUT" is obtained through the optical fiber 30-2. As is obvious from "IN" and "OUT", the transmission line of the output side appears to be the same as that of the input side, and accordingly, the influence of a fault is very slight, even in the case of a complete disconnection.

Figure 7:
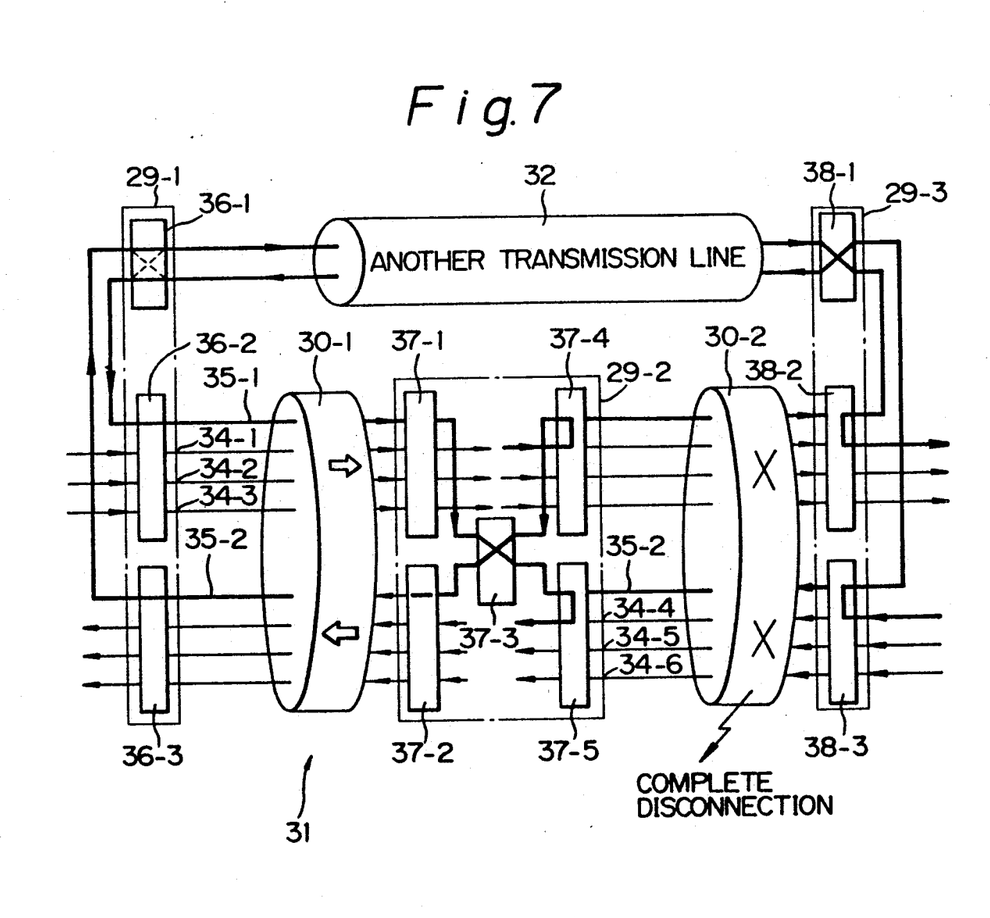
FIG. 7 is a detailed diagram for explaining the other connection configuration and flow of the information in a transmission line switching system shown in FIG. 5.

FIG. 7 is a detailed diagram for explaining the other connection configuration and flow of the information in a transmission line switching system shown in FIG. 5.

This is the case where the optical fiber cable 30-2 is completely disconnected. The thick solid line also denotes the flow of the information when the optical fiber cable 30-2 is completely disconnected, and in this case, the spare cable 35-2 also cannot be used. Note, since the flow of the information is clearly shown by the thick solid lines, the explanation thereof is omitted.

FIG. 8 is a schematic diagram of one example of a transmission line, for example, a telephone circuit connected between cities located far from each other, through a plurality of terminal repeaters having the intermediate relay function. The circuit switching apparatuses are provided adjacent to each repeater. The line 13 (between Tokyo and Osaka) is the main transmission line. For example, if the transmission line is completely disconnected between Yokohama and Nagoya, the information from Tokyo is sent to Yokohama and returned to Tokyo and transferred to Osaka through Nagano on another transmission line 14, returned to Nagoya, and then transferred to Osaka. Accordingly, the influence of a fault in the main transmission cable does not affect the transmission of the information.

In the above embodiment, although the explanation is given for an optical fiber type cable, it is possible to apply the present invention to a coaxial type cable.

Further, in the above embodiment, since the power source to each terminal repeater is supplied from another power source line, it is not necessary to take into account the influence of a fault based on a complete disconnection of the cable.

We claim:

1. A transmission line switching system for switching a transmission line, connected between a head terminal repeater and an end terminal repeater, comprising:
   a transmission line connected between the head terminal repeater and the end terminal repeater, and including:
      a plurality of terminal repeaters,
      a plurality of circuit switching apparatuses, respectively operatively connected to corresponding ones of said terminal repeaters, and
      a plurality of transmission cables, respectively connected between a corresponding one of said circuit switching apparatuses and a corresponding one of said terminal repeaters; and
   another transmission line connected between the head terminal repeater and the end terminal repeater and in parallel with said transmission line;
   each of said circuit switching apparatuses include:
      detecting means for detecting if one of said plurality of transmission cables is completely disconnected; and
      means, responsive to said detecting means, for returning information input from the head terminal repeater to a terminal repeater located just before a disconnection in the transmission cable back to said head terminal repeater, for transferring the information from the had terminal repeater to the end terminal repeater through said another transmission line, for transferring the information from the end terminal repeater to a terminal repeater located just after said disconnection in the transmission cable, and for transferring the information to the end terminal repeater.

2. A transmission line switching system as claimed in claim 1, wherein each of said terminal repeaters include intermediate relay means for inserting to and deriving from an external circuit the information.

3. A transmission line switching system as claimed in claim 1, wherein each of said transmission cables includes a plurality of main cables and a spare cable bundled with said main cables.

4. A transmission line switching system as claimed in claim 1, wherein each of said transmission cables comprises an optical fiber cable.

5. A transmission line switching system as claimed in claim 1, wherein each of said transmission cables comprises a coaxial cable.

6. A transmission line switching system as claimed in claim 1, wherein each of said circuit switching apparatuses includes switching means for performing a loop back function to return the information to at least one of said head terminal repeater and said end terminal repeater.

7. A transmission line switching system as claimed in claim 1, wherein each of said circuit switching apparatuses is provided adjacent to each of said terminal repeaters.

8. A transmission line switching system as claimed in claim 1, wherein each of said circuit switching apparatuses comprises a plurality of optical switches, each respective connected to a corresponding one of said transmission cables.

* * * * *

UNITED STATES PATENT AND TRADEMARK OFFICE
CERTIFICATE OF CORRECTION

PATENT NO. : 5,109,296

DATED : April 28, 1992

INVENTOR(S) : Fukushima et al.

It is certified that error appears in the above-identified patent and that said Letters Patent is hereby corrected as shown below:

On the Title page, item [21], "Appl. No.: 693,179" should be

--Appl. No.: 698,179--.

Col. 6, line 48, "respective" should be --respectively--.

Signed and Sealed this

Twenty-eighth Day of September, 1993

Attest:

BRUCE LEHMAN

*Attesting Officer*    *Commissioner of Patents and Trademarks*